Sept. 17, 1963 J. W. BALENGER 3,104,388

KEYBOARD SIGNAL GENERATOR

Filed March 28, 1962 2 Sheets-Sheet 1

INVENTOR.
John W. Balenger
BY Joseph A. Genovese & Max L. Libman
ATTORNEYS

Sept. 17, 1963 J. W. BALENGER 3,104,388

KEYBOARD SIGNAL GENERATOR

Filed March 28, 1962 2 Sheets-Sheet 2

INVENTOR.
John W. Balenger
BY Joseph A. Genovese &
Max L. Libman
ATTORNEYS 3,104,388

KEYBOARD SIGNAL GENERATOR

John W. Balenger, Rockville, Md., assignor to Rabinow Engineering Co. Inc., Rockville, Md.

Filed Mar. 28, 1962, Ser. No. 183,195
17 Claims. (Cl. 340—345)

This invention relates to electromechanical signal generators and particularly to devices capable of providing selected unique output signals in response to input stimuli.

The type of signal with which the invention is principally concerned is the time-sequential electric pulse group, which is very familiar to those dealing with telegraph, Teletype, computer systems, and many other fields. Time sequential electric pulse group signals consist of a sequence of electric pulses which occur in rapid succession and in a pattern which relates in a predetermined manner to that which the pattern represents. For example, the pattern could represent any of the alpha-numeric characters, symbols, etc. The present invention provides an improved signal generator for producing time sequential pulse groups regardless of how the output signals are used, i.e. to operate a punch, to energize a magnetic recording head, etc., and also regardless of what information, data, etc. the signals represent. However, in order to simplify the description, the following is concerned principally with time sequential pulse groups which represent ordinary characters and symbols such as found in our alpha-numeric system.

The signal generator exemplifying the invention is a photoelectric device wherein the output signals are obtained in response to depression of keys arranged in an assembly such as, or analogous to, an ordinary typewriter. It is understood that prior photoelectric coding devices in this general arrangement have been proposed. For example, U.S. Patent No. 2,861,262 discloses a keyboard type, photoelectric signal generator which provides time sequential pulse group outputs. To the user, the present signal generator exemplifying the invention will operate in the same manner; that is, by depression of the key, an output code will be generated which is peculiar to the character (or the equivalent) which that key represents.

My improvement is in the means that I use to interrupt a light path or paths to enable the photocell (or photocells) to transduce the interrupted light into electrical output signals. Where prior proposals have suggested light-blanking by cards or panels, I use a group of rotary discs in the light path, together with unique means for driving selected discs. My discs are serially coded, for instance by having successive stations which may be either transparent or opaque. Transparency can be achieved by having portions of the disc apertured or by having the discs made of transparent material and masked over the entire area except where transparency is desired. In my system, all of the discs normally remain idle; that is, at rest. When in the rest position the transparent stations (henceforth called apertures) of each disc are aligned allowing a light path to be established between a source and the photoelectric pickup device. Then, when it is desired to generate a code, a key is depressed causing one of the discs to be rotated. As this disc rotates, the light path is interrupted in accordance with the code of the rotating disc. Thus, the photocell provides outputs which correspond to the light interruptions, and these outputs will be in serial form.

My system for causing the selected discs to rotate entails a unique operation. I have a driver, for instance, a friction roller adjacent to the group of discs but when the discs are in the rest position there is a clearance between the discs and the roller. Each disc has a notch or flat immediately opposing the roller to provide this clearance. However, when a given disc is rotated through a very small arc. e.g. a few degrees, the notched part of the periphery of the disc moves away from the roller, and the arcuate periphery engages the rotating roller so that the roller drives the disc through its cycle of operation, preferably almost 360 degrees.

An important feature of the invention is the way that the small initial rotation is imparted to a selected disc. Each disc has an escapement made of a projection on the face of each disc, and an escapement member which is operated by one of the keys. The escapement member is so constructed that when it is moved a very short distance toward the axis of rotation of the disc, a lug, finger or the like contacts the projection on the disc and exerts a force on the disc in a direction that rotates the disc a very short distance, but sufficient to move the flat or notch away from the roller and bring the periphery of the disc against the roller. At that instant the roller drives the disc at a predetermined speed (corresponding to the speed of the roller) through approximately 360 degrees at which the flat again opposes the roller to again provide the clearance between the roller and disc which establishes the non-driving condition or rest position of the disc.

Another feature of the invention is that the discs can be made of any practical diameter to contain a considerable quantity of code data. The drawings show discs having two separate nine-bit codes and a clock-pulse code to synchronize readout by means of exceedingly simple logic circuitry. Accordingly, a further object of the invention is to provide a signal generator of the general type under discussion, where the code discs are capable of containing more than one code and means to develop clock signals to be combined with the codes at read-out thereby providing time sequential pulse groups on one or more output lines depending on whether the user desires to maintain the codes of each disc separate or desires to mix them.

Other objects and features of importance will become apparent in following the description of the illustrated forms of the invention.

Figures 1, 3A:
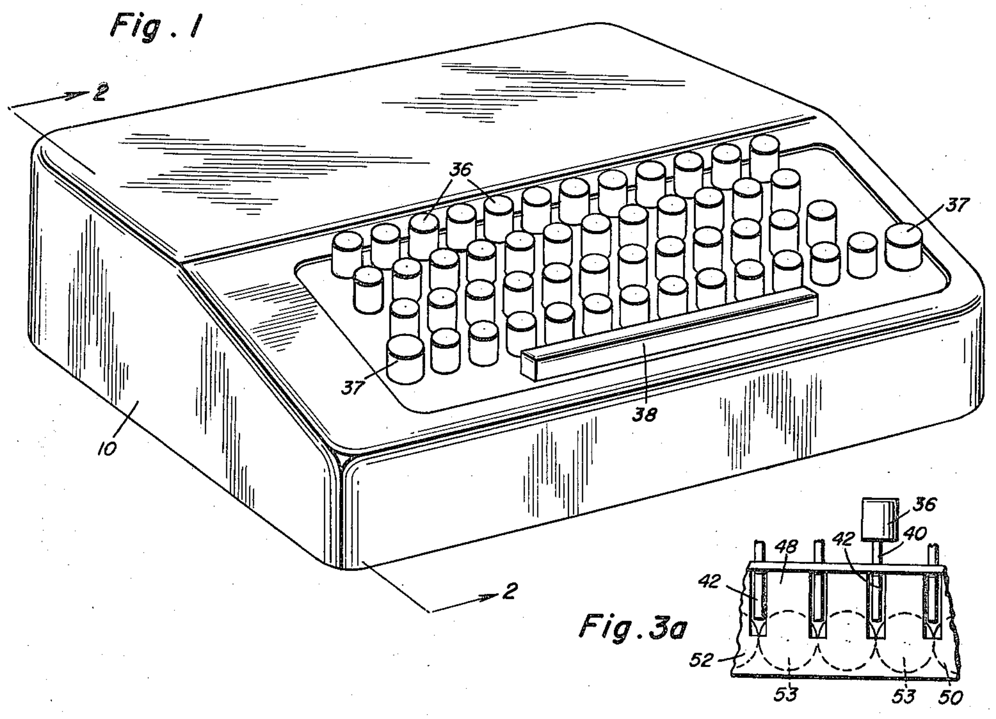
FIGURE 1 is a perspective view of a signal generator exemplifying the invention.
Figures 3, 4, 4A, 4B:
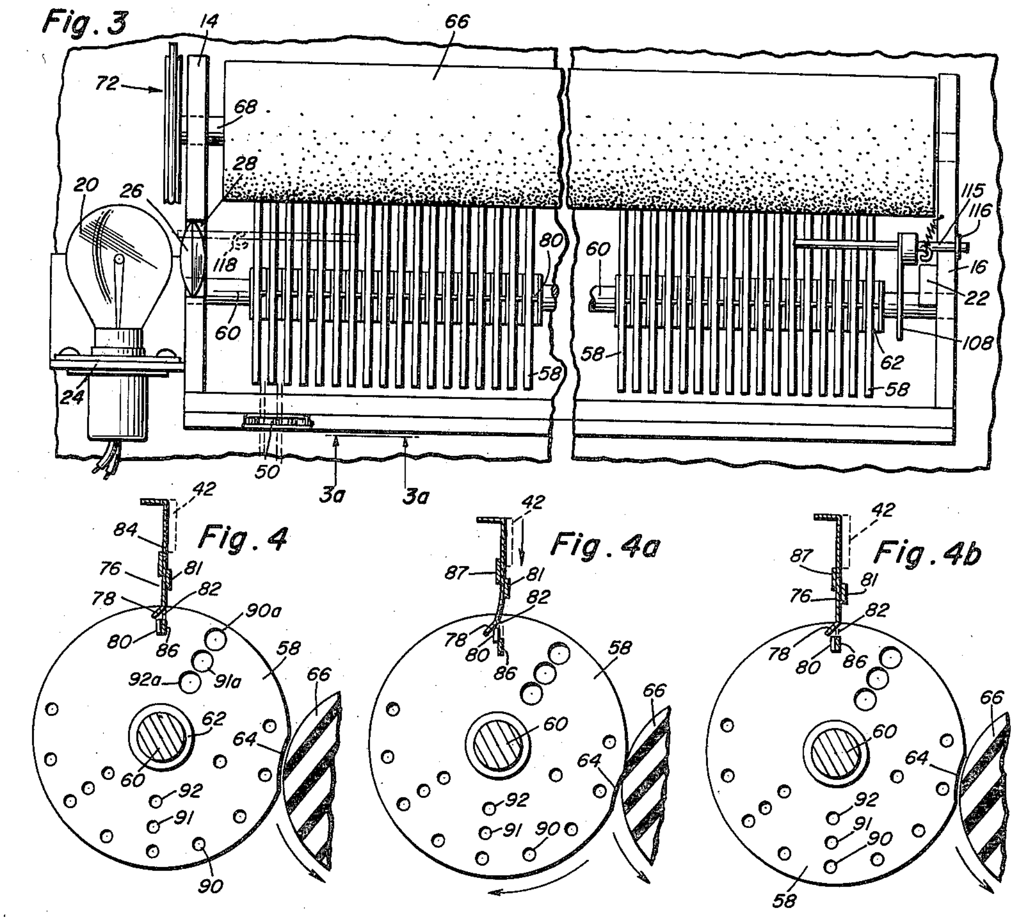
FIGURE 3 is a top diagrammatic view of a part of the device taken along the line 3—3 of FIGURE 2.

FIGURE 3*a* is a view taken on the line 3*a*—3*a* of FIGURE 3.

FIGURE 4 is a fragmentary sectional view showing one of the discs in the rest position.

FIGURE 4*a* is a view similar to FIGURE 4 but showing the relative positions of the escapement, disc and drive roller just after one of the keys has been depressed.

FIGURE 4*b* is a view similar to FIGURE 4, showing the disc when it has completed one cycle of operation and the key has been released allowing the stop on the escapement to form an abutment for a projection on one face of the disc.

Figure 5:
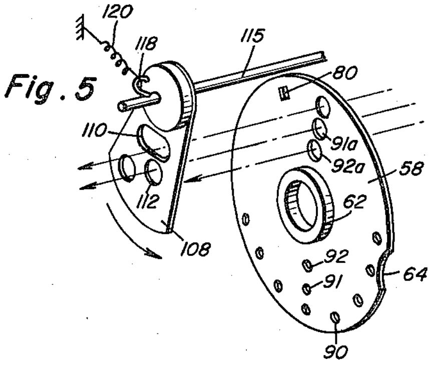

FIGURE 5 is a fragmentary perspective view showing a mask for one of the codes of a typical disc.

Figures 5A, 6:
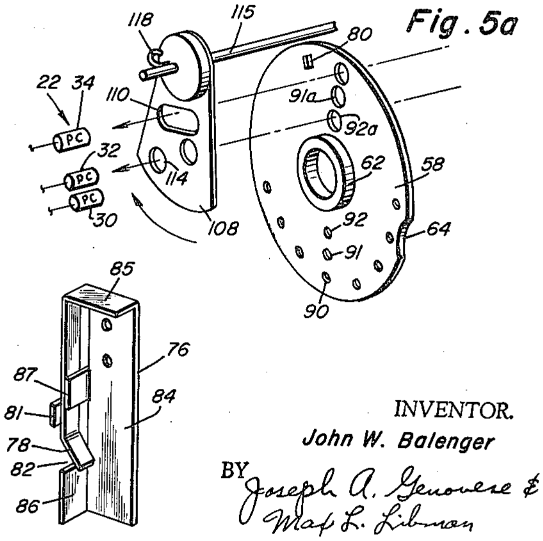

FIGURE 5*a* is a view similar to FIGURE 5 but showing the mask in a second position.

FIGURE 6 is a perspective view of an escapement member constituting a part of the signal generator.

Figure 7:
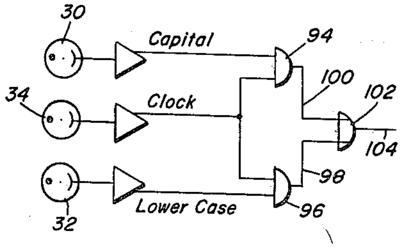
Figure 7A:
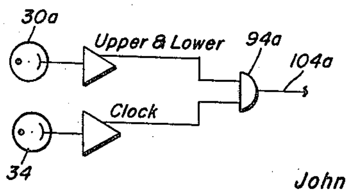

FIGURES 7 and 7*a* are logic diagrams showing only two of many possible variations for combining the output signals of the photoelectric pickup devices of the signal generator to provide time sequential pulse group signals to be used with other equipment.

Figure 2:
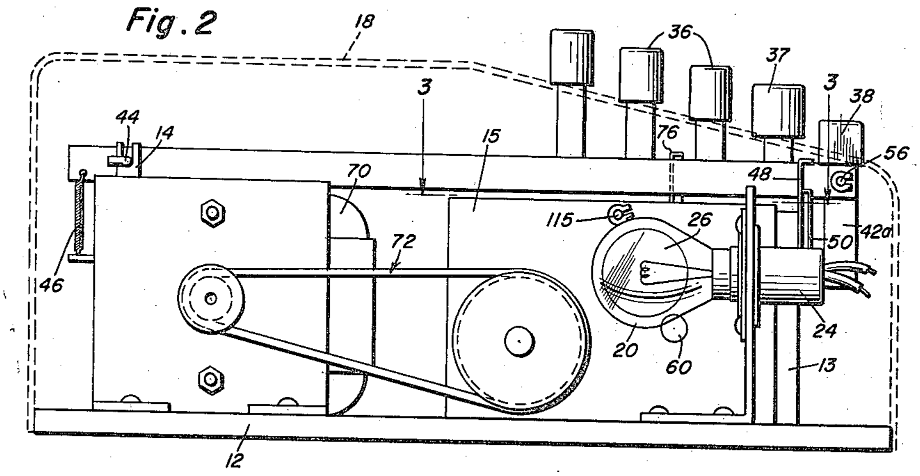
FIGURE 2 is an elevational view showing the side of the device of FIGURE 1 along the line 2—2, with the cover shown in dotted lines.

FIGURES 1–3 show signal generator 10 which exemplifies the invention. The signal generator has a frame constructed of a base 12 with four shallow sides 13, 14, 15 and 16 rising therefrom, and enclosed under a cover 18. The optical system establishes a light path from a source of illumination, for example, light bulb 20, to a photosensitive pickup device 22 (FIGURES 3 and 5*a*). Lamp 20 is mounted by an ordinary bracket which supports a conventional socket 24 to retain the filament of the lamp in alignment with lens 26. The lens is in an opening 28 formed in frame side 14. The photoelectric pickup device 22 is mounted on side 16 of the frame by a suitable holder for three photocells 30, 32 and 34 (FIGURES 5*a* and 7) to allow the light from lens 26 to fall upon the front surfaces of the photocells. As will be seen later (FIGURE 7*a*) pickup device 22 may have only two photocells under certain conditions.

Keys 36 are conventional, as is space bar 38. All of the keys, except the space bar and shift keys 37 are mounted in the same manner. For instance, a typical key 36 (FIGURE 3*a*) is composed of a button at the upper end of an arm 40 whose lower end is fixed to a horizontal key-bar 42. The rear end of the key-bar 42 is supported on a transverse pivot 44 attached to the rear wall 14 of the frame. All of the key-bars have their rear ends disposed in upwardly opening saddles which form lateral-constraint guides for the bars, requiring them to pivot in vertical planes. A resilient return is provided for each key-bar, for example, a spring 46 attached to a part of the rear frame wall and to the extremity of a typical key-bar. The front end of the key-bar is constrained to vertical motion by comb 48 which is either formed as a part of or attached to the front frame wall 13. Accordingly, when a key 36 is depressed, the key-bar associated with it is pivoted about the axis of pin 44 and against the yielding opposition of spring 46. This spring provides the return force to elevate the key-bar and key. The downward motion of the key is established by the lower surface (FIGURE 3*a*) of the key-bar contacting the bottom of the device 50, described below.

I preferably have device 50 associated with the comb and key-bars to prevent more than one key-bar from being depressed concurrently. This device is not part of this invention and a variation thereof is found on other keyboard type equipment. It functions by having a plurality of balls, discs, rollers 53 etc. in a track 52 with slots aligned with the comb slots. The total clearance between all rollers 53 is such to accommodate the thickness of only one key-bar at a time, and once a single key-bar is depressed and laterally displaces the rollers 53, there is insufficient clearance at another comb-slot station to allow another key-bar to be depressed.

The space bar 38 could be mounted exactly as the other keys, but it is shown mounted slightly differently so that it is lower than the first row of keys. Thus, the key-bar for the shift key 38 projects forwardly a little farther than all of the others (FIGURE 2) and is attached thereto by a pivot rod 56. The arm 42*a* is connected to the frame wall 13 by a slide or pivot merely to help constrain the motion of space bar 38 to a vertical plane.

A group of rotary members such as discs 58 (FIGURES 4–4*b*) are mounted for free rotation on a spindle 60. The spindle is attached to opposite frame sides 14 and 16 and is provided with means to maintain all of the discs slightly spaced and parallel. These means are conventional spacers 62, e.g. hubs on the discs 58, and locking rings engaged with the shaft 60 at spaced intervals along its length. Discs 58 are circular except for small peripheral flats or notches 64 (FIGURES 4–4*b*). When the discs are in the rest position (FIGURE 4) the notches or flats provide clearance between the periphery of the discs and a resilient drive roller 66. The roller is fixed to shaft 68 which is mounted for rotation in bearings attached to frame sides 14 and 16. One end of the shaft is driven by a motor 70 through a suitable transmission, for example, a belt and pulley assembly 72 (FIGURE 2). Thus, the roller 66 is maintained in continuous operation, and the discs are all slightly spaced from the roller by virtue of their notches 64. Each disc is associated with one of the keys 36 (and 38) and is actuated in response to depression of its key. The way this is done is shown best in FIGURES 4–4*b*. When a key is depressed, its key-bar moves downward thereby moving an escapement device or member 76 downward and causing an angulated spring finger 78 to bear against projection 80 which protrudes from one face of typical disc 58. Spring finger 78 is struck from the body of device 76, as is the fulcrum 87 for the bending of finger 78. In use, the spring finger 78 first bears against the top edge of projection 80 and as the device 76 moves farther down, the spring finger deflects (to the left as shown in FIGURE 4*a*) with the projection 80 being pressed (due to the resilience of the spring finger) against stop 86 of device 76. As the device 76 moves down just a little farther, opening 82 in device 76 becomes aligned with projection 80 allowing the energy stored in spring finger 78 (and the sloping face of finger 78) to push the projection through the opening 82. This rotates the entire disc through a small angle, say a few degrees. However, the angular motion is sufficient to move the flat (64) part of the disc periphery away from the roller 66 so that the circular part of the periphery of the disc contacts the surface of the roller thereby establishing a frictional driving connection between the roller and the disc.

Since the periphery of the disc is in contact with roller 66, the roller propels the disc rotationally through an angle of slightly less than 360 degrees. While this is happening the user will ordinarily release finger pressure from the key allowing the spring 46 to return the key-bar and escapement device to the original position (FIGURE 4*b*) at which the stop 86 is engaged by the projection 80. In this position, which is again the rest position, the driving connection between the disc and the roller is broken because the notch or flat 64 now opposes the roller. If the operator of the device fails to release finger pressure from the key, the only difference in the operation would be that the projection 80 would not strike the stop 86. Instead, it would strike a portion of the finger 78 whose flexure in one direction is limited by stop 81. As soon as manual pressure is released from the key, spring 46 will elevate the escapement device and the projection 80 would simply slide off of the sloping surface of the finger and assume the position shown in FIGURE 4*b*.

FIGURE 6 shows the escapement device apart from a key-bar. The escapement device is preferably (but not necessarily) made of a single piece of spring material, as beryllium copper, spring steel, etc. Thus, the finger 78 can be made as a comparatively long arm attached to a top wall 85 of the escapement device. This will assure a high degree of resilience. The position of the finger can be adjusted by bending the fulcrum tab 87 attached to the back wall of the escapement device and engaging one face of the comparatively long arm whose lower end constitutes finger 78. Stop 81 can also be struck from the body of device 76, or this, as well as the other parts of device 76 can be fabricated by any other customary fabrication method.

As was previously discussed, signals are derived by the photocell pick up 22 in accordance with the interruptions (and non-interruptions) of the light beam by the apertures of the set of discs. All of the discs are formed with a group of three comparatively large apertures 90*a*, 91*a* and 92*a* (or a slot) which are aligned when the discs are all in a rest position. This provides a set of tunnels for the light from the lamp 20 to the photosensitive device. I have three arcuate code channels 90, 91 and 92 in each disc, with the outer channel having a code made of uniformly spaced apertures to establish clock pulses. The second channel 91 contains a code which is established by a group of successive stations containing apertures or imperforate areas depending on what the code represents. The inner channel 92 is also formed by an arcuate array of apertures and imperforate areas respectively. It can be arbitrarily assumed that the inner code defines capital letters and symbols whereas the intermediate code defines lower case letters and symbols. It is now evident that when a selected disc is cycled by depression of a key 36 (or key 38) one photocell 34 is pulsed with light interruptions defining clock pulses whereas either or both of the other photocells are energized with light information corresponding to the codes of channels 91 and 92. There are many ways that the codes can be used. For instance, the clock output of photocell 34 can be amplified (FIGURE 7) and applied as a single input to two coincidence AND gates 94 and 96. The photocell 30 for the capital letters provides an amplified output which is fed to gate 94 whereas the photocell 32 for lower case letters provides an amplified output which is fed to gate 96. The outputs of the two gates on lines 98 and 100 are OR gated at 102 to provide a new output on line 104 which would conduct either upper or lower case-defining time sequential pulse groups. Obviously, if it is desired to maintain the codes of channels 91 and 92 separate, the outputs are taken directly from lines 98 and 100 thereby omitting gate 102 and line 104.

FIGURE 7*a* is included merely to show that I can use a single photocell in place of photocells 30 and 32. Photocell 30*a* would take the place of the two photocells and have its output amplified and applied to a coincidence AND gate 94*a*. The clock signals derived from photocell 34 are amplified and also applied to the same gate so that the output on line 104*a* is a time sequential pulse group signal corresponding to the code of the selected disc which is actuated. In order to prevent the codes of channels 91 and 92 from being scrambled at the photocell 30*a* (or photocells 30 and 32) I can use a mask 108 (FIGURES 5 and 5*a*) which would correspond to the shift key operation of a typewriter, assuming that the codes of channels 91 and 92 represent upper and lower case letters respectively. Mask 108 in one position (FIGURE 5) blanks one of the light passages 92*a*, allows light to pass through the clock channel through slot 110, and allows light to pass through the code channel 91 by having hole 112 aligned therewith. In the other position (FIGURE 5*a*) light passes through the clock channel and channel 92 through mask hole 114 aligned with light passage 92*a* but the light for channel 91 is blocked by the mask.

The mask 108 can be mounted in numerous ways, one of which (FIGURE 3) is to support it on a shaft 115 which is mounted for rotation in bearings 116 at the frame sides 14 and 16. Mask 108 is located between the photosensitive device 22 and the nearest disc 58. Thus, by having shift keys 37 at opposite sides of the keyboard (like a conventional typewriter keyboard) and two shift key-bars mounted as the other key-bars (without discs 58, escapements, etc.) either can be depressed to bear against one of the two cams 118 (FIGURES 3 and 5) which will cause the shaft 115 to rotate against the yielding opposition of a pair of return springs 120 attached to the cams 118 and to the frame. These springs could obviously be replaced by torsion springs associated with the shaft 115. If it is desired to have a latch to hold the shift key temporarily depressed, this expedient, being conventional, may be resorted to.

It is understood that various changes and modifications as well as alterations may be resorted to without departing from the protection of the following claims. Further, I have mentioned only a few specific uses of the invention and these may be varied considerably.

What is claimed is:

1. A signal generator to provide discrete output signals, said generator comprising an energy source and a pick up device spaced from said source to define an energy path therebetween, means to interrupt said path in a manner that the pattern of interruptions define an energy code which reaches said pickup device, said interrupting means including a plurality of juxtaposed code members, means mounting said code members for rotational displacement in said energy path, rotary power source means adjacent to said code members, and means relying on an initial fraction of a full cycle of rotary motion of one of said code members for drivingly connecting said code member with said rotary source to actuate said code member and provide a pattern of energy interruptions unique to the code of said code member.

2. The generator of claim 1 wherein the code of said code member is established by a serial group of stations associated with said member, and said stations having an arrangement of imperforate and transparent areas which are serially presented to said energy path as the rotated member is driven by said rotary power source means.

3. The generator of claim 2 wherein said code member actuating means include a movably mounted device which engages said code member and rotates said member through a small arc in response to movement of said movable device, and said device constituting a stop for said member when said member has been driven through its cycle by said rotary power source means.

4. The generator of claim 3 and said rotary power source means including a drive roller, each code member comprising a disc, each disc having a clearance between its periphery and said roller when said discs are in a rest position, and the periphery of a disc engaging said roller when said disc is initially rotated through said small arc by said movable device.

5. In a key-controlled signal generator using a light source and a photocell to establish a light path, a key mechanism having a plurality of keys, a plurality of discs in face to face relation, means mounting said discs for rotation in said light path, each disc having code-defining light transmissive areas with the bits of the code areas arranged serially, a rotary power source including a roller adjacent to the peripheries of said discs, each disc having a clearance between the disc and said roller when said discs are in the rest position and contacting said roller when initially moved from the rest position so that said roller rotates said disc, and means rendered operative to initially move a selected disc in response to depression of a selected key.

6. In a key-controlled signal generator using a light source and a photocell to establish a light path, a key mechanism having a plurality of keys, a plurality of discs in face-to-face relation, means mounting said discs for rotation in said light path, each disc having code-defining light transmissive areas with the bits of the code areas arranged serially, a rotating roller parallel to the axis of rotation of said discs and located adjacent to the peripheries of said discs, each disc having a clearance between the disc and said roller when said discs are in the rest position and contacting said roller when a selected disc is initially moved from the rest position so that said roller rotates said disc, and means rendered operative to initially move a selected disc in response to depression of a selected key, so that said roller drives a selected disc to a position at which there is again a disc-to-roller clearance.

7. The subject matter of claim 6 and means establishing a stop for said selected disc to prevent said disc from being over-driven.

8. The subject matter of claim 7 wherein said stop and said means to initially move said selected disc are movable in unison in response to actuation of said selected key.

9. In a key-controlled signal generator using a light source and a photocell to establish a light path, a key mechanism having a plurality of keys, a plurality of discs in face-to-face relation, means mounting said discs for rotation in said light path, each disc having code-defining light transmissive and opaque areas with the bits of the code arranged serially, a rotary power source including a drive roller adjacent to the peripheries of said discs, each disc having a clearance between the disc and said roller when said discs are in the rest position and each disc contacting said roller when initially moved from the rest position so that said roller rotates said disc, each disc having a projection, a mover for each disc, said movers operable to rotate said discs in response to actuation of said keys by exerting a force against said projections thereby initially moving said discs through an arc sufficient to bring the peripheral surfaces of said discs in contact with said drive roller.

10. In a key-controlled signal generator using a light source and a photocell to establish a light path, a key mechanism having a plurality of keys, a plurality of discs in face-to-face relation, means mounting said discs for rotation in said light path, each disc having code-defining light transmissive and opaque areas respectively, the bits of the code arranged serially, a drive roller adjacent to the peripheries of said discs, means for rotating said roller, each disc having a clearance between the disc and said roller when said discs are in the rest position and contacting said roller when initially moved from the rest position so that said roller rotates said disc, each disc having a projection, a mover for each disc, each mover operable to rotate said disc in response to actuation of one of said keys by exerting a force against one of said projections thereby initially moving the associated disc, a stop associated with each key-controlled mover and normally forming an abutment for a disc-projection, and said stop being moved to a position to free said projection for rotation when one of said movers is actuated thereby allowing said roller to rotate a said disc through a complete cycle.

11. In a key-controlled signal generator using a light source and a photocell to establish a light path, a key mechanism having a plurality of keys, a plurality of discs in face to face relation, means mounting said discs for rotation in said light path, each disc having code-defining light transmissive and opaque areas with the bits of the code arranged serially, a drive roller adjacent to the peripheries of said discs, each disc having a clearance between the disc and said roller when said discs are in the rest position and contacting said roller when initially moved from the rest position so that said roller rotates said disc, each disc having a projection, a mover for each disc, said movers operable to rotate said discs in response to actuation of said keys by exerting a force against said projections thereby initially moving said discs, a stop associated with each key-controlled mover and normally forming an abutment for a disc-projection, said stop being moved to a position to free said projection for rotation when a key is actuated thereby allowing said roller to rotate a said disc through a complete cycle, and said stop returning into the path of travel of said projection when the key is restored to its rest postion.

12. A serial output signal generator comprising a light source, photosensitive means spaced from said source and providing a light path therebetween, a plurality of rotary discs arranged face-to-face in said light path, said discs having an optical code including a group of transparent and opaque areas respectively, means to initiate rotation of a selected disc, and drive means responsive to initial rotation of said selected disc to continue the rotation of said selected disc at a constant speed independent of the speed of said rotation initiating means, thereby interrupting serially said light path in a pattern corresponding to the code of said selected disc so that said photosensitive means provide corresponding outputs synchronized with said drive means.

13. A serial output signal generator comprising a light source, photosensitive means spaced from said source and providing a light path therebetween, a plurality of rotary discs arranged face-to-face in said light path, said discs having code forming means defined by a group of transparent and opaque areas respectively, means to rotate a selected disc thereby interrupting said light path in a pattern corresponding to the code of said selected disc so that said photosensitive means provide corresponding outputs, means to provide clock pulses in coordination with the rotation of said disc, and means responsive to said outputs and clock pulses to provide a new signal which uniquely corresponds to said pattern of opaque and transparent areas of said disc.

14. A serial output signal generator comprising a light source, photosensitive means spaced from said source and providing a light path therebetween, a plurality of rotary discs arranged face-to-face in said light path, said discs having code forming means defined by a group of transparent and opaque areas respectively, means to rotate a selected disc thereby interrupting said light path in a pattern corresponding to the code of said selected disc so that said photosensitive means provide corresponding outputs, said disc rotating means including a power driver for said discs, and means to displace a selected disc an amount sufficient to couple the selected disc with said power driver by which the disc is cycled independent of said disc displacing means.

15. The signal generator of claim 14 wherein said disc displacing means include an escapement associated with said selected disc.

16. In a photoelectric system to produce time sequential pulse group signals, photosensitive signal producing means and a spaced light source defining a light path, a plurality of discs in said light path, means mounting said discs so that they are capable of being rotated, said discs being optically coded to interrupt said light path in a manner peculiar to the disc code, a drive member for said discs, said drive member being normally uncoupled from said discs, and escapement means for each disc to move a selected disc a predetermined amount sufficient to couple the disc with said drive member so that said drive member rotates said discs a further amount limited by said escapement means during which rotation the optical code of said disc interrupts the light reaching said photosensitive means to provide a time sequential pulse group output signal from said photosensitive means.

17. The subject matter of claim 16 wherein said escapement means include a projection on said disc, a device movable in a direction to rotate said disc by moving said projection, and a stop on said movable device which is successively moved out of the path of said projection and returned into the path of said projection in coordination with the initial movement-producing action of said device.

References Cited in the file of this patent

UNITED STATES PATENTS

| | | |
|---|---|---|
| 2,408,754 | Bush | Oct. 8, 1946 |
| 3,017,463 | Dinsmore et al. | Jan. 16, 1962 |